N. L. REID.
MOLD FOR CHIMNEY TOPS.
APPLICATION FILED NOV. 17, 1909. RENEWED MAR. 11, 1911.
1,002,314.
Patented Sept. 5, 1911.
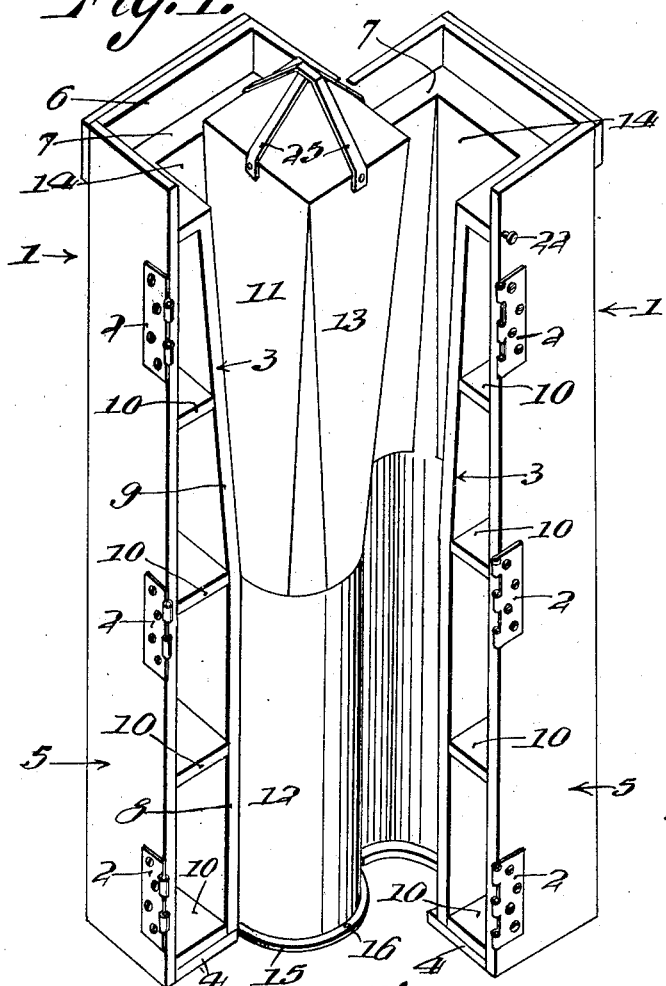
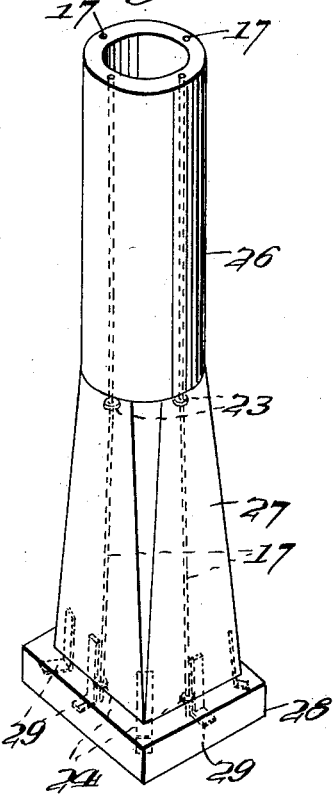
Witnesses
M. E. Connor
A. M. Murray
Inventor
Newton Lyle Reid
by J. B. Cralle
Attorney
COLUMBIA PLANOGRAPH CO., WASHINGTON, D. C.

UNITED STATES PATENT OFFICE.

NEWTON LYLE REID, OF CANTON, ILLINOIS.

MOLD FOR CHIMNEY-TOPS.

1,002,314. Specification of Letters Patent. Patented Sept. 5, 1911.

Application filed November 17, 1909, Serial No. 528,584. Renewed March 11, 1911. Serial No. 613,852.

*To all whom it may concern:*

Be it known that I, NEWTON LYLE REID, a citizen of the United States, residing at Canton, in the county of Fulton and State of Illinois, have invented new and useful Improvements in Molds for Chimney-Tops, of which the following is a specification.

The present invention is an improvement in chimney-top molds, and its primary object comprehends the production of a mold by means of which an article of the class specified may be readily, effectively, and expeditiously cast from cementitious material, the mold being simple in its construction, composed of a minimum number of parts, and capable, therefore, of being manufactured at an extremely low cost.

More especially, the invention resides in the production of a chimney-top mold wherein the molding surface of the mold proper is so shaped as to impart to the molded article a combined frusto-conical and cylindrical conformation, the diameter of the smaller end of the lower or frusto-conical portion being the same, or practically the same, as that of the upper or cylindrical portion, thereby placing the weight at the base of the molded article and enabling it in consequence to rest squarely and permanently upon the top of the chimney.

The invention further resides in the employment of a core which, by reason of its particular form, and of its arrangement within the mold, may be constructed solid and may be readily withdrawn from the mold when the contents thereof have become hardened to a certain extent.

Finally, the invention includes the employment of removable spacer plates for maintaining the reinforcing wires in proper position during the molding operation.

A structural embodiment of the invention is illustrated in the accompanying drawings, whereof:—

Figure 1 is a perspective view of said invention, the mold being shown in open position, Fig. 2 is a perspective view of one of the molded articles, Fig. 3 is a vertical sectional view of the article, taken on a smaller scale, Fig. 4 is a perspective view of the top spacer plate, Fig. 5 is a section taken on the line 5—5 of Fig. 4, Fig. 6 is a diametric sectional view of the bottom spacer plate, and Fig. 7 is a further detail sectional view of the molded article showing one of the angle pieces for reinforcing the base thereof.

Reference being had to said drawings, and to the characters marked thereon, it will be seen that the mold consists essentially of but two parts, namely, the mold proper and the core. It will also be seen that both parts are inverted with respect to the molded article shown in Fig. 2, and hence the terms "top" and "bottom" employed have reference to the position of the parts during the molding operation, or, in other words, that position which said parts occupy in Fig. 1.

The mold proper comprises two counterpart members or halves 1—1 having a series of hinge connections 2—2 between their presented edges, by means of which connections said members may be joined together and locked when the molding takes place. The actual molding surface of the mold is constituted by an inner shell 3 suitably constructed, its lower edge resting upon and secured to the lower end piece 4 of the mold, while its upper edge terminates appreciably short of corresponding edge of the outer shell 5, thereby providing a chamber 6 hereinafter more particularly referred to. The piece 7 which forms the bottom wall of this chamber is shown in the present instance as formed integral with the inner shell, though this is not essential. The upper end of the mold is open to constitute a pouring mouth.

The lower portion 8 of the inner shell 3 is cylindrical in form while the upper portion 9 has approximately, an inverted frusto-conical formation, the diameter of the cylinder being the same as that of the lower or smaller end of the latter portion. Shell 3 is maintained in spaced relation to the outer shell 5 throughout its entire length by blocks or boards 10. In considering the foregoing, it is to be noted that half of the inner and outer shells of which the mold proper is composed is constituted by one of the members 1, and the other half of said shells by the other member.

The core 11 has the same general conformation as the inner shell 3. That is to say, it comprises a cylindrical lower portion or body 12 and an inverted frusto-conical upper portion 13, said parts having the same relative proportions as the corresponding parts of shell 3. The dimensions of the core are, however, sufficiently less than those of said shell to provide a chamber 14 between said core and shell for the reception of the plastic cement, concrete, or similar material employed, the afore-mentioned chamber 6 constituting a continuation of this chamber.

At its bottom, the core carries an annular spacer plate 15 of convexo-concave formation. This plate is attached in any suitable manner to the core at the point specified and is formed with a series of perforations 16 which receive the lower ends of the stay wires 17 shown in Figs. 2 and 3. These wires are arranged in the mold chamber 14 and extend from end to end thereof, their upper ends projecting through perforations 18 formed in the bottom wall of the frusto-pyramidal upper spacer plate 19. Plate 19 is formed with a continuous depending flange 20 at its upper edge, said flange being arranged to take over the upper edge of the rectangular outer shell 5, and thus support plate 19 during the filling of the molding chamber. Plate 15 serves to close the lower end of said chamber, while the upper end of the chamber is left partly open by cutting away the greater portion of the bottom of plate 19 to permit the cementitious material to be poured thereinto, the body or main side wall of that plate being inwardly inclined, to facilitate such operation. The flange portion 20 of plate 19 is formed with a series of notches 21 which receive headed bolts 22 set into the sides of shell 3, thereby holding said plate against accidental displacement.

The wires 17 above referred to carry washers 23 and 24, located, respectively, centrally and adjacent the lower ends thereof. When the spacer plates are in place, these washers will maintain the wires in proper position within the molding chamber and will aid the plates to some extent in centering the core.

During the casting operation, the mold is mounted on a suitable support, (not shown), and the plastic material poured into the molding chamber. When the level of the material about reaches the lower edge of the upper spacer plate 19, said plate is lifted off from the mold; the pouring is then continued until the material flows into and fills chamber 6. When the material has hardened sufficiently to become self-sustaining, the core, which has previously been greased, may likewise be lifted out of the mold, strap handles 25 being attached to the upper end of the core for that purpose. After the material has become completely hardened, the hinge-connections 2 are unfastened, whereupon the molded article may be removed.

Figs. 2, 3 and 7 of the drawings illustrate the finished article. It, of course is hollow and has the same shape as the compound chamber 14—6, comprising a cylindrical upper portion 26, a frusto-conical body portion 27, and an enlarged rectangular base 28. It is reinforced by the embedded wires 17 which strengthen it to such an extent that it is practically unbreakable, and even if such accident should take place, said wires would yet hold the parts together. In addition to these wires angle braces 29 are provided. These braces are embedded in the base portion of the article and extend upwardly into the body portion thereof. They are arranged in the manner shown in Fig. 3; that is to say, both at the corners or edges of the compound portion 27—28, and between said corners or edges.

Owing to the flat formation of the base portion 28, and to the disposition of the weight at such point, it will be apparent that the top will rest squarely and permanently upon the chimney. It may be added to any chimney, to increase the height thereof, and is much less expensive and much more durable and effective than the heavy iron structure ordinarily in use. Moreover, the core itself is solid, and hence is necessarily less costly than the collapsible and contractible cores hitherto employed.

I claim as my invention:—

1. A chimney mold, composed of two parts hingedly related to each other, each of said parts including an outer wall, and an inner wall spaced therefrom and of less length than the outer wall, the inner wall tapering outwardly from a point approximately midway of the length of the outer wall, transverse partitions holding the inner and outer wall in spaced relation to each other, top and bottom elements closing the space between the inner and outer walls, the bottom elements extending beyond the inner faces of the inner wall, a core, a plate secured to the lower end of the core and seating on said extended portions of said bottom elements to close the lower end of the mold, said plate being formed with perforations, and means to hold the hinged parts together, said means including a member seating on top of the hinged parts and having a depending flange which engages the sides of the hinged parts, said members also having a bottom wall formed with perforations, said perforations of the bottom core plate and of said member being adapted to receive and hold reinforcing wires.

2. A chimney mold, composed of two parts, hingedly related to each other, a core, a perforated plate, said plate conjointly serving to close the bottom of the mold, and at the same time affording means for receiving and holding reinforcing wires in said perforations, means for holding the hinged parts of the mold together, said means consisting of a member seated on top of the hinged parts and having a depending, continuous notched flange, said flange engaging the outer sides of the hinged parts, bolts on the outside of the hinged parts which are received in said notches of said member whereby the member is held in position and the hinged members are held in closed relation to each other, said member also having a bottom wall formed with perforations, said perforations of the said member being adapted to receive and hold reinforcing wires.

3. A chimney mold composed of two parts, a core, a perforated spacer plate carried by the core at the base thereof, means carried by said parts to receive and support said spacer plate, and a plate seating on the top end of said parts, said plate having a perforated portion and a depending flange which engages the sides of said parts to hold the latter in closed position, said perforations of both of said plates being for the reception of reinforcing wires for the chimney.

In testimony whereof I have hereunto set my hand in presence of two subscribing witnesses.

NEWTON LYLE REID.

Witnesses:
JOE J. BROWN,
D. E. WHEELER.

Copies of this patent may be obtained for five cents each, by addressing the "Commissioner of Patents, Washington, D. C."